May 28, 1935. W. D. CROWELL 2,002,730
VENTILATING APPARATUS FOR VEHICLE BODIES
Filed Feb. 1, 1933
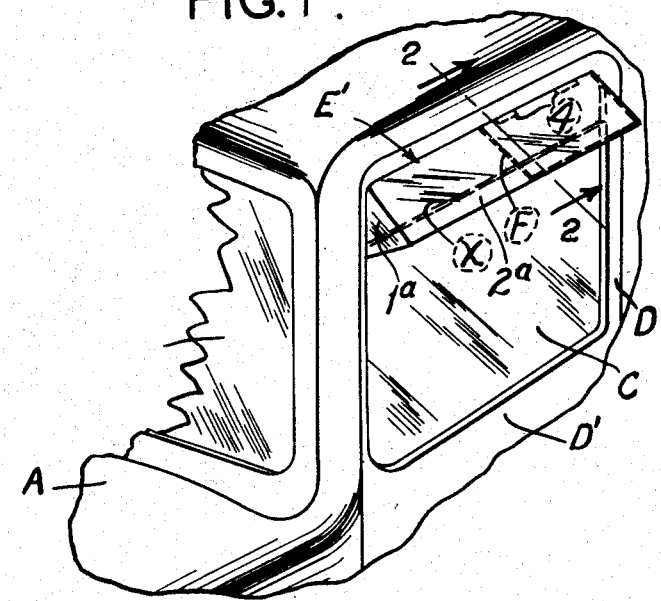
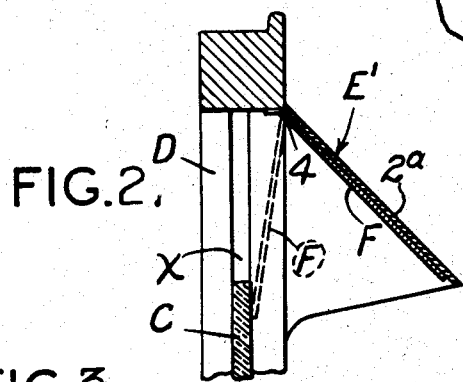
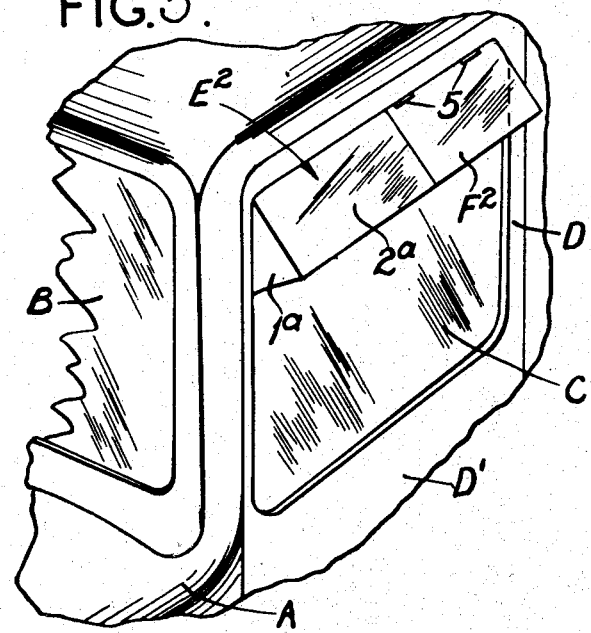
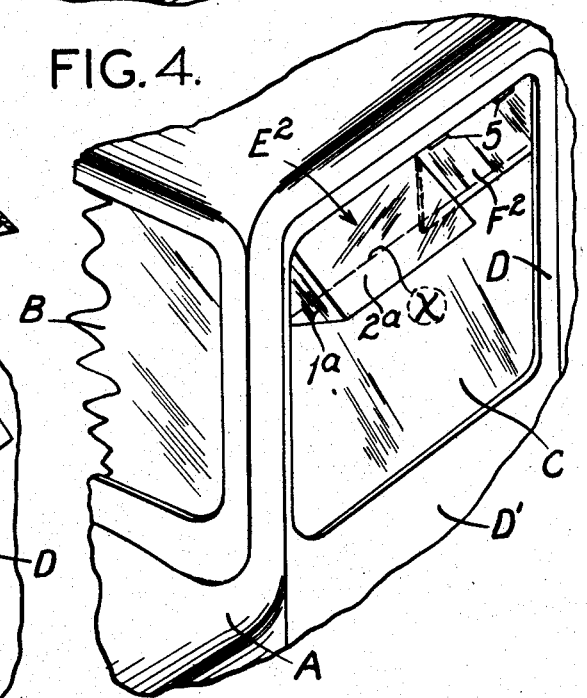
INVENTOR;
WILLIAM D. CROWELL
By Bakewell & Church
ATTORNEYS Patented May 28, 1935

2,002,730

UNITED STATES PATENT OFFICE 2,002,730

VENTILATING APPARATUS FOR VEHICLE BODIES

William D. Crowell, St. Louis, Mo., assignor to Automobile Ventilation, Inc., Detroit, Mich., a corporation of Michigan Application February 1, 1933, Serial No. 654,576

3 Claims. (Cl. 98—2)

This invention relates to vehicle body ventilating devices of the kind that comprise a ventilating opening in a side wall portion of the body, proportioned and arranged so that when the vehicle is traveling forwardly, the air which rushes rearwardly over said side wall will create a suction or partial vacuum that is exerted on said ventilating opening in such a way that air, gases, smoke and the like on the interior of the body will be effectively withdrawn from same through said ventilating opening.

The main object of my invention is to provide a vehicle ventilating apparatus of the general type mentioned, that is equipped with a novel means for enhancing the suction effect on the ventilating opening and for preventing air from blowing into the vehicle through the rear portion of the space at the top edge of a partly lowered window in the side wall of the vehicle, when said window is adjusted so as to ventilate the vehicle. Other objects and desirable features of my invention will be hereinafter pointed out.

Figure 1 of the drawing is a perspective view illustrating one form of my invention wherein a hinged flap or pivotally mounted element on the interior of the suction intensifier is provided for preventing air from blowing into the vehicle through the rear portion of the space at the top edge of the window when said window is lowered slightly to ventilate the vehicle.

Figure 2 is a sectional view, taken on the line 2—2 of Figure 1.

Figure 3 is a perspective view, illustrating a vehicle ventilating apparatus of the general type shown in Figure 1, in which the suction intensifier and rain deflector is so constructed that the rear half portion of same can be shifted into a position to serve as a partial closure for the space at the top edge of the window when the window is adjusted or set so as to produce a ventilating slot through which air is exhausted from the interior of the vehicle; and Figure 4 is a perspective view of the ventilating apparatus illustrated in Figure 3, showing the rear half portion of the suction intensifier and deflector adjusted in the position which it is intended to occupy when the ventilating slot is in use.

In the various views of the drawing A designates a vehicle body, such, for example, as an automobile body, B designates the wind shield of the body, C designates a vertically-adjustable window in a side wall of said body, and D designates a frame for said window. Said frame D may consist of an integral or stationary part of the side wall of the body, or it may be formed by the upper portion of a side wall door D' (either front or rear door) whose lower half is constructed so as to serve as a pocket for the window C when said window is open or in its lowered position.

In Figure 1 of the drawing I have illustrated a vehicle ventilating apparatus comprising a ventilating slot or exhaust opening $x$ formed by the front end portion of the space between a vertically-adjustable window C, and the top horizontal member of a frame D for said window, and a suction intensifier and rain deflector E' formed by a canopy, hood or shield mounted on the exterior of the window frame and provided with an upright, laterally-projecting portion $1^a$ in advance of the ventilating slot $x$ and a laterally-projecting, downwardly-inclined roof portion $2^a$ that extends across the full width of the window. Said hood or canopy may consist of a relatively shallow shield of the kind heretofore used on automobile doors at the upper end of same, constructed from metal or any other suitable material and mounted on the door or window in any preferred manner. When the window C is in a partially lowered position, or, in other words, when the window is adjusted to produce a ventilating slot $x$ at the top edge of same, the rear portion of the space between the top edge of the window and the top member of the window frame is closed by a hinged or pivotally mounted flap F that is combined with the member E'. In the form of my invention illustrated in Figures 1 and 2 the flap or closure F is connected by hinges or similar devices 4 to the interior of the member E' and is so constructed that it will be housed within and concealed by the member E' when said flap is not in use. When the window C is partially lowered to ventilate the vehicle, the flap or element F is swung downwardly from the position shown in full lines in Figure 2, into the position shown in broken lines, so as to close approximately the rear half of the space at the top edge of the window, and thus prevent the inwardly-flowing air currents on the exterior of the body from blowing into the body over the upper edge of the window. Instead of mounting the hinged flap or closure F on the member E', said flap can be mounted on the top horizontal member of the window frame, or, if desired, it can be mounted on the interior of the roof portion of the body of the vehicle in such a way that it can be swung downwardly into operative position, so as to form a partial closure for the space at the top edge of the window when the window is adjusted to ventilate the body.

In Figures 3 and 4 of the drawing I have illustrated a vehicle ventilating apparatus similar to that shown in Figure 2, but distinguished from same, in that it is equipped with a suction intensifier and rain deflector provided with a movable or adjustable portion that is adapted to be shifted into a position so as to close the rear portion of the space at the top edge of the window when the window is adjusted to produce a ventilating slot through which air, gases and the like are withdrawn from the interior of the vehicle. As shown in Figures 3 and 4, the suction intensifier and rain deflector that is mounted on the exterior of the window frame comprises a stationary or non-adjustable front portion $E^2$, and an adjustable rear portion $F^2$. Said portions $E^2$ and $F^2$ are so constructed and arranged that when the ventilating slot $x$ is not in use, said portions extend flush with each other, as shown in Figure 3, and thus co-operate with each other to form, in effect, a conventional hood or canopy at the upper end of the window C. The stationary or non-adjustable portion $E^2$ comprises a laterally-projecting, upright portion $1^a$ at its front end that is used to enhance or increase the suction effect on the ventilating slot $x$ that is produced by partially lowering the window C, and said stationary portion $E^2$ also has a roof part $2^a$ that prevents rain from beating into the ventilating slot $x$. The rear portion $F^2$ of said suction intensifier and deflector is preferably connected by hinges 5 to the top horizontal member of the window frame D, and is so proportioned that after the window has been partially lowered to produce a ventilating slot, said rear portion $F^2$ can be swung downwardly into the position shown in Figure 4, so as to form a closure for approximately the rear half portion of the space at the top edge of the window. Any suitable or preferred means may be used to hold the adjustable rear portion $F^2$ either in longitudinal alignment with the front portion $E^2$, as shown in Figure 3, or in the position shown in Figure 4, wherein said rear portion $F^2$ prevents the inwardly-flowing currents of air on the exterior of the body from blowing into the body over the upper edge of the partially lowered window C. One convenient way of constructing said adjustable rear portion $F^2$ is to mount it on hinges 5 of the friction type. It is immaterial whether or not the suction intensifier and deflector shown in Figure 1 or the one shown in Figure 3 is provided at its rear end with a portion corresponding to the upright, laterally-projecting portion $1^a$ at its front end.

Having thus described my invention, what I claim as new and desire to secure by Letters Patent is:

1. A side wall door for vehicle bodies, provided with a vertically-adjustable window that is adapted to be partially lowered so as to produce a ventilating slot at the top edge of the window, a window pocket in said door, a suction intensifier and rain deflector mounted on the exterior of said door at the upper end of the window opening therein and provided with a portion for enhancing the suction effect on said ventilating slot, and an adjustable means for preventing air from blowing into the vehicle over the top edge of the window when the ventilating slot is in use, consisting of a hinged or pivotally mounted element carried by and housed within said suction intensifier and deflector.

2. A side wall door for vehicle bodies, provided with a vertically-adjustable window that is adapted to be partially lowered so as to produce a ventilating slot at the top edge of the window, a window pocket in said door, a suction intensifier and rain deflector mounted on the exterior of said door at the upper end of the window opening therein and provided with a portion for enhancing the suction effect on said ventilating slot, and an adjustable means for preventing air from blowing into the vehicle over the top edge of the window when the ventilating slot is in use, consisting of a hinged or pivotally mounted portion of the suction intensifier and deflector.

3. A side wall door for vehicle bodies, provided with a vertically-adjustable window that is adapted to be partially lowered so as to produce a veintilating slot at the top edge of the window, a window pocket in said door, a suction intensifier and rain deflector mounted on the exterior of said door at the upper end of the window opening therein and provided with a portion for enhancing the suction effect on said ventilating slot, and an adjustable means for preventing air from flowing into the vehicle over the rear top edge of the window only when the ventilating slot is in use, comprising a hinged or pivotally mounted member movable from substantially the plane of said deflector and independently thereof into position to close off the rear portion only of said ventilating slot.

WILLIAM D. CROWELL.